United States Patent
Hashitani et al.

(10) Patent No.: US 6,374,477 B1
(45) Date of Patent: Apr. 23, 2002

(54) METHOD FOR WORKING INPUT SHAFT FOR TOROIDAL-TYPE CONTINUOUSLY VARIABLE TRANSMISSION

(75) Inventors: Hideki Hashitani; Masami Tanaka, both of Saitama (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/632,579

(22) Filed: Aug. 4, 2000

(51) Int. Cl.$^7$ ................................................ B23P 13/04
(52) U.S. Cl. .................... 29/558; 148/579; 148/597; 148/598
(58) Field of Search ................. 29/558, DIG. 49; 148/559, 579, 595, 597, 598

(56) References Cited

U.S. PATENT DOCUMENTS

| | | | | |
|---|---|---|---|---|
| 3,489,620 A | * | 1/1970 | Current | 148/572 |
| 4,131,491 A | * | 12/1978 | Joseph | 148/537 |
| 5,458,153 A | * | 10/1995 | Roeske | 137/625.24 |
| 5,682,745 A | * | 11/1997 | Phillips | 60/431 |
| 5,735,769 A | * | 4/1998 | Takemura et al. | 476/46 |
| 5,855,531 A | * | 1/1999 | Mitamura et al. | 476/46 |
| 6,074,324 A | * | 6/2000 | Ishikawa et al. | 476/42 |
| 6,261,203 B1 | * | 7/2001 | Shimizuya et al. | 476/40 |

FOREIGN PATENT DOCUMENTS

| | | | |
|---|---|---|---|
| JP | 62-71465 | 5/1987 | F16H/15/38 |
| JP | 1-173552 | 12/1989 | F16H/15/38 |

OTHER PUBLICATIONS

Catalog of Japan Electrical Discharge Machine Co., Ltd.

* cited by examiner

*Primary Examiner*—S. Thomas Hughes
*Assistant Examiner*—Essama Omgba
(74) *Attorney, Agent, or Firm*—Sughrue Mion, PLLC (57) ABSTRACT

After heat treatment for hardening the outer peripheral surface of the input shaft 15 is enforced, a straightening operation for straightening the bent portions of the input shaft 15 caused by the heat treatment is carried out prior to formation of the through holes 17, 17. After then, the input shaft 15 is machined using electric sparks to thereby form the through holes 17, 17 in the input shaft 15. In the present working method, there is eliminated the possibility that, during the straightening operation, stresses can concentrate in the through holes 17, 17 portions of the input shaft 15, thereby being able to attain the above object.

2 Claims, 6 Drawing Sheets

METHOD FOR WORKING INPUT SHAFT FOR TOROIDAL-TYPE CONTINUOUSLY VARIABLE TRANSMISSION

BACKGROUND OF THE INVENTION

1. Field of the Invention

The present invention relates to an improved method for working an input shaft constructing a part of a toroidal-type continuously variable transmission which is used, for example, as a car transmission; and, in the improved method, the incidence of defective products caused when working input shafts is restrained to thereby be able to enhance the yield rate of the input shaft and thus reduce the cost of the input shaft as well as the cost of the toroidal-type continuously variable transmission.

Figure 2:
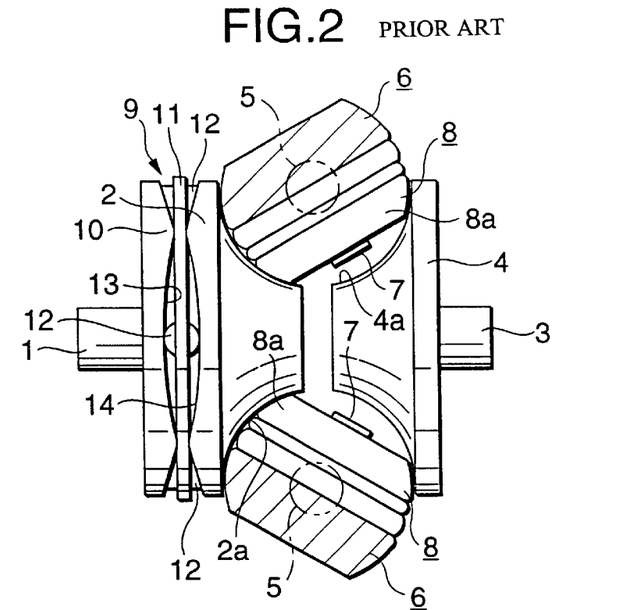
FIG. 2 is a side view of the basic structure of a conventionally known toroidal-type continuously variable transmission, showing the maximum rotation speed ratio decreasing state thereof.
Figure 3:
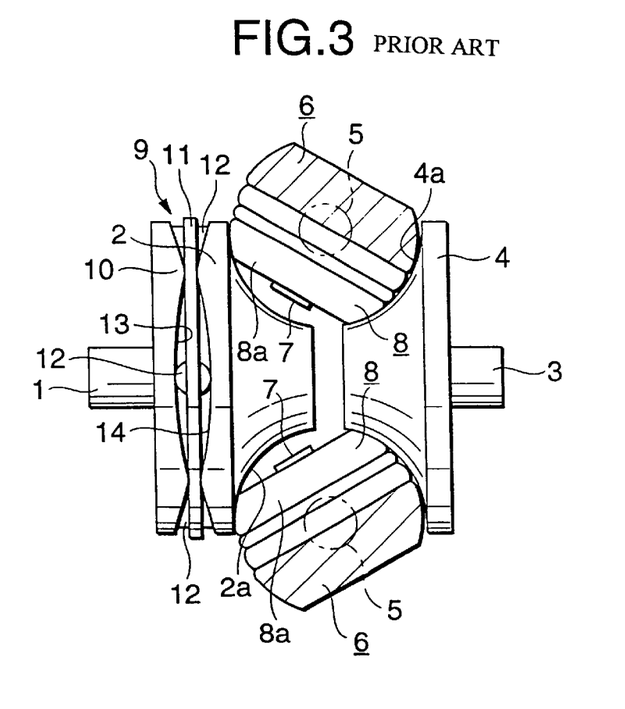
FIG. 3 is also the side view of the basic structure of the conventionally known toroidal-type continuously variable transmission, showing the maximum rotation speed ratio increasing state thereof.

Conventionally, it has been studied to use such a toroidal-type continuously variable transmission as shown in FIGS. 2 and 3 as a transmission unit for a vehicle. This is generally referred to as a half-toroidal-type continuously variable transmission. In the conventional half-toroidal-type continuously variable transmission, for example, as disclosed in JP-A-62-71465U, an input side disk 2 is supported concentrically with an input shaft 1, while an output side disk 4 is fixed to the end portion of an output shaft 3 disposed concentrically with the input shaft 1. In the interior portion of a casing in which the half-toroidal-type continuously variable transmission is stored, in more particular, at the axial-direction middle positions of the input side and output side disks 2, 4, there are disposed trunnions 6, 6. These trunnions 6, 6 are respectively oscillatable about their associated pair of pivot shafts 5, 5 which are set at torsional positions with respect to the input and output shafts 1 and 3, that is, at positions that are perpendicular to the axial direction (in FIGS. 2 and 3, in the tight and left direction) of the input and output shafts 1 and 3 and do not intersect the center axes of the input and output shafts 1 and 3.

That is, in the case of the trunnions 6, 6, the pivot shafts 5, 5 are arranged on the outer surfaces of the two end portions of the trunnions 6, 6 in such a manner that the pivot shafts 5, 5 are concentric with each other. The base end portions of displacement shafts 7, 7 are supported on the respective middle portions of the trunnions 6, 6 and, by oscillating the trunnions 6, 6 about their respective pivot shafts 5, 5, the inclination angles of the displacement shafts 7, 7 can be freely adjusted. On the peripheries of the displacement shafts 7, 7 respectively supported on the trunnions 6, 6, there are rotatably supported a plurality of power rollers 8, 8. And, the plurality of power rollers 8, 8 are respectively held by and between the mutually opposed inner surfaces 2a, 4a of the input side and output side disks 2, 4. The mutually opposing inner surfaces 2a, 4a each have a cross section formed as a concave surface which can be obtained by rotating an arc with the pivot shaft 5 as the center thereof. On the other hand, the power rollers 8, 8 respectively have peripheral surfaces 8a, 8a each of which is formed as a spherically convex surface. And, the peripheral surfaces 8a, 8a are respectively contacted with the inner surfaces 2a, 4a.

Between the input shaft 1 and input side disk 2, there is interposed a pressure device 9 such as a loading cam. Thus, the input side disk 2 can be elastically pushed toward the output side disk 4 by the pressure device 9. The pressure device 9 comprises a cam plate 10 rotatable together with the input shaft 1, and a plurality of rollers 12, 12 (for example, four rollers) which are respectively rollably held by a retainer 11. On one side surface (in FIGS. 2 and 3, the right side surface) of the cam plate 10, there is formed a cam surface 13 constructing a curved surface extending in the circumferential direction of the cam plate 10; and, on the outer surface (in FIGS. 2 and 3, the left side surface) of the input side disk 2 as well, there is formed a cam surface 14 which is similar in shape to the cam surface 13. And, the plurality of rollers 12, 12 are supported in such a manner that they can be freely rotated about their respective axes extending in the radial direction with respect to the center of the input shaft 1.

When the above-structured half-toroidal-type continuously variable transmission is in operation, in case where the cam plate 10 is rotated due to the rotation of the input shaft 1, the plurality of rollers 12, 12 are respectively pressed against the cam surface 14 formed on the outer surface of the input side disk 2 by the cam surface 13 of the cam plate 10. As a result of this, the input side disk 2 is pressed against the plurality of power rollers 8, 8 and, at the same time, the pair of cam surfaces 13, 14 and the plurality of rollers 12, 12 are pressed against each other, thereby causing the input side disk 2 to be rotated. And, the rotation of the input side disk 2 is transmitted to the output side disk 4 through the plurality of power rollers 8, 8, with the result that the output shaft 3 fixed to the output side disk 4 can be rotated.

Of cases in which the rotation speed ratio (transmission ratio) between the input shaft 1 and output shaft 3 is to be changed, at first, when decreasing the rotation speed ratio between the input shaft 1 and output shaft 3, the trunnions 6, 6 may be swung about their respective pivot shafts 5, 5 in a given direction. And, the displacement shafts 7, 7 are inclined in such a manner that the peripheral surfaces 8a, 8a of the power rollers 8, 8, as shown in FIG. 2, can be respectively contacted with the near-center portion of the inner surface 2a of the input side disk 2 and with the near-outer-periphery portion of the inner surface 4a of the output side disk 4. On the other hand, when increasing the rotation speed ratio, the trunnions 6, 6 may be swung about their respective pivot shafts 5, 5, in the opposite direction. And, the displacement shafts 7, 7 are inclined in such a manner that the peripheral surfaces 8a, 8a of the power rollers 8, 8, as shown in FIG. 3, can be respectively contacted with the near-outer-periphery portion of the inner surface 2a of the input side disk 2 and with the near-center portion of the inner surface 4a of the output side disk 4. In case where the inclination angles of the displacement shafts 7, 7 are set in the middle of the inclination angles in FIGS. 2 and 3, there can be obtained a middle rotation speed ratio between the input shaft 1 and output shaft 3.

Figure 4:
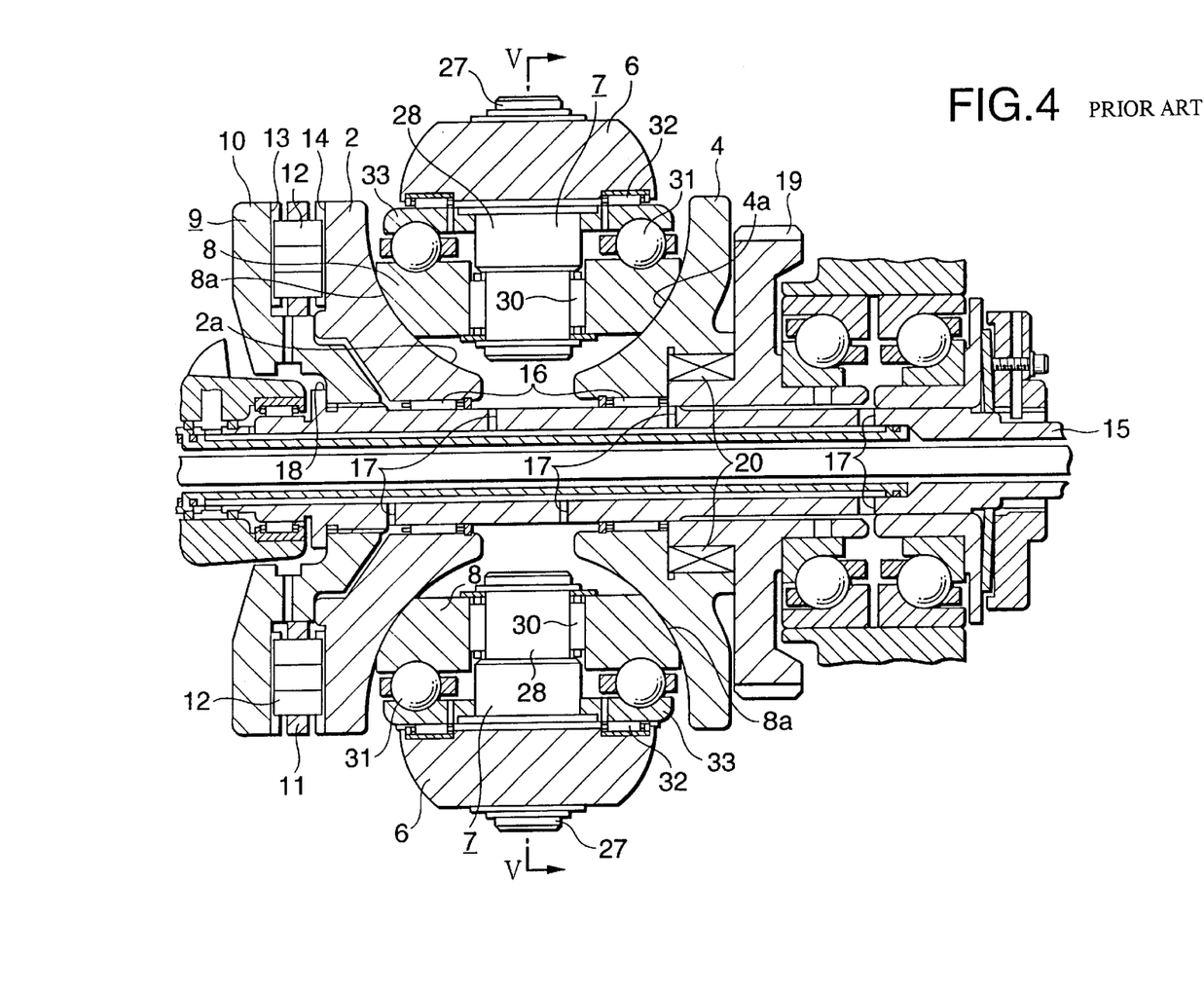
FIG. 4 is a section view of an example of a concrete structure of a toroidal-type continuously variable transmission.
Figure 5:
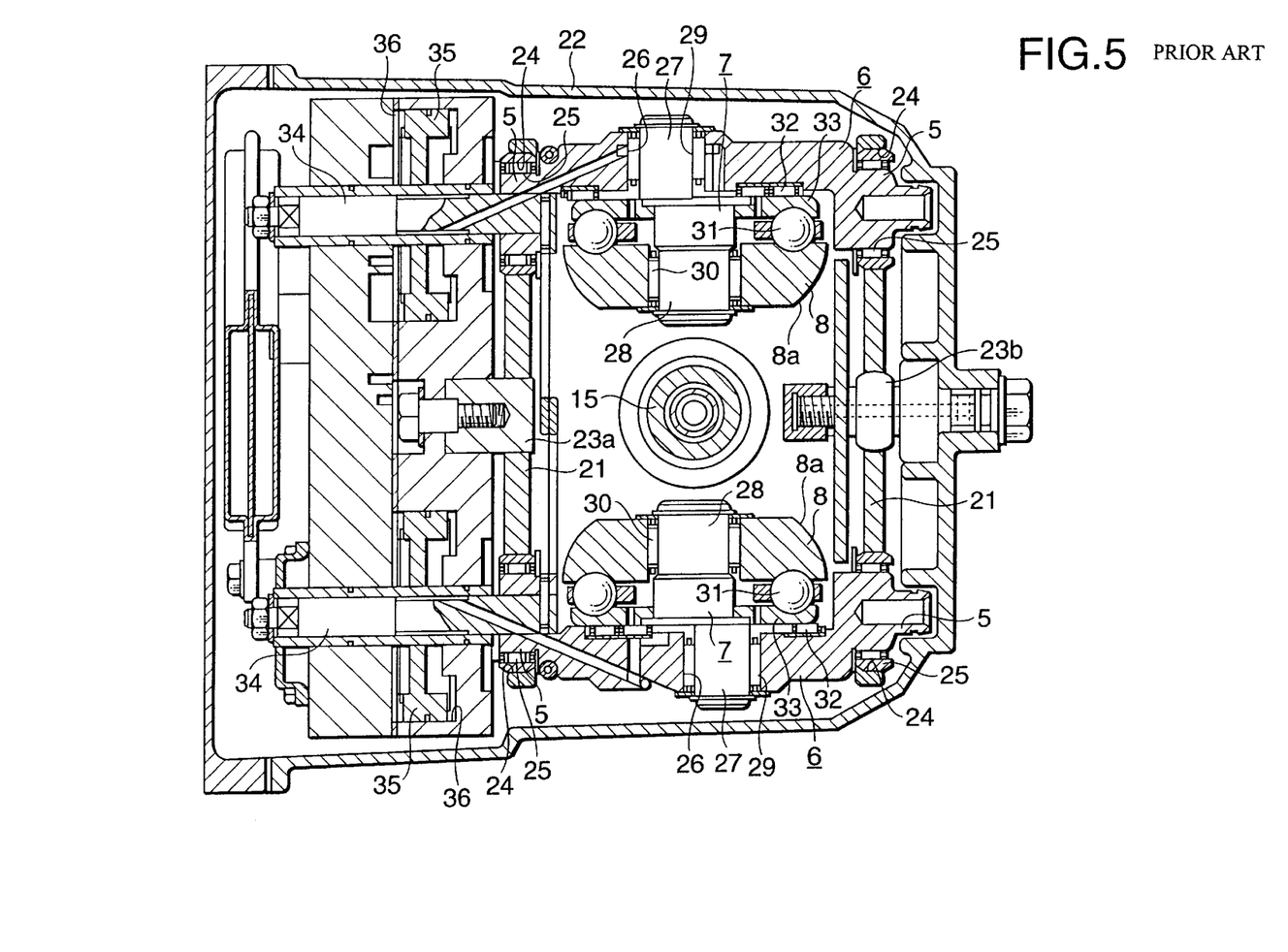
FIG. 5 is a section view taken along the line V—V shown in FIG. 4.
Figure 6:
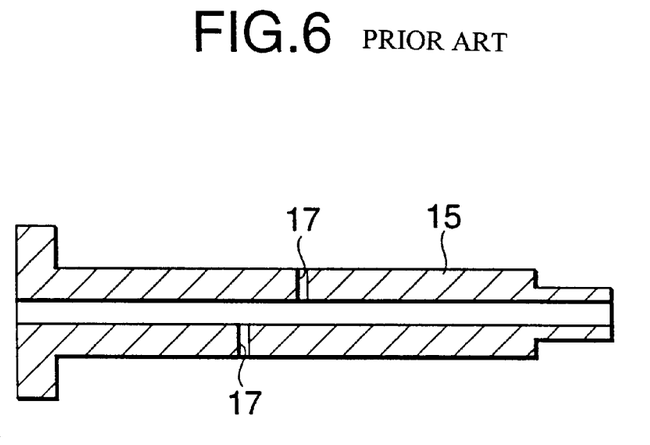
FIG. 6 is a section view of an input shaft taken out of the toroidal-type continuously variable transmission shown in FIG. 4.

Now, FIGS. 4 and 5 show an example of a more specific structure of a toroidal-type continuously variable transmission which is disclosed in JP-A-1-173552U. In this structure, an input side disk 2 and an output side disk 4 are rotatably supported on the peripheries of a circular-pipe-shaped input shaft 15 through their respective needle roller bearings 16, 16. In the case of the input shaft 15, as can be seen clearly from FIG. 6 in which, of the component members of the toroidal-type continuously variable transmission, only the input shaft 15 is shown, at a plurality of positions in the middle portion of the input shaft 15 in the axial direction (in FIGS. 4 and 6, in the right and left direction) thereof, there are formed through holes 17, 17 which respectively allow the two inner and outer peripheral surfaces of the input shaft 15 to communicate with each other. When the toroidal-type continuously variable transmission is in operation, lubricating oil (traction oil), which has been supplied into the interior portion of the input shaft 15 from oil supply means such as an oil supply pump (not shown), is discharged externally of the input shaft 15 through the through holes 17, 17 to thereby lubricate movable portions existing in the periphery of the input shaft 15, such as the needle roller bearings 16, 16.

Also, a camplate 10 is spline engaged with the outer peripheral surface of the end portion (in FIG. 4, the left end portion) of the input shaft 15, while a collar portion 18 prevents the cam plate 10 from moving in a direction in which it parts away from the input side disk 2. And, the cam plate 10 and rollers 12, 12 cooperate together in forming a pressure device 9 which, in accordance with the rotation of the input shaft 15, rotates the input side disk 2 toward the output side disk 4 while pressing the input side disk 2. And, an output gear 19 is connected to the output side disk 4 through keys 20, 20, whereby the output side disk 4 and output gear 19 can be rotated in synchronism with each other.

The pivot shafts 5, 5 are respectively supported on a pair of support plates 21, 21 in such a manner that they can be swung as well as can be shifted in the axial direction thereof (in FIG. 4, in the front and back direction; and, in FIG. 5, in the right and left direction). That is, within a housing 22 in which a main body of the toroidal-type continuously variable transmission is stored, the pair of support plates 21, 21 are disposed in parallel with each other so as to interpose the input side and output side disks 2, 4 from both sides thereof between them as well as in such a manner that the support plates 21, 21 can be shifted slightly with their respective support posts 23a, 23a as the centers thereof. And, the pivot shafts 5, 5 disposed on the respective two end portions of the two support plates 21, 21 are supported inside circular holes 24, 24 formed in the mutually corresponding portions of the trunnions 6, 6 by radial needle roller bearings 25, 25 in such a manner that they can be swung as well as can be shifted in the axial direction thereof. The circular holes 24, 24 and the pivot shafts 5, 5 are respectively present at torsional positions which are perpendicular (in FIG. 4, in the front and back direction; and, in FIG. 5, in the right and left direction) to the axial direction of the center axes of the two disks 2, 4 (in FIG. 4, in the right and left direction; and, in FIG. 5, in the front and back directions.

In the middle portions of the trunnions 6, 6 whose two end portions are supported on their respective support plates 21, 21 in this manner, there are formed circular holes 26, 26, respectively. And, in the circular holes 26, 26 portions of the trunnions 6, 6, there are supported a pair of displacement shafts 7, 7, respectively. The pair of displacement shafts 7, 7 respectively include support shaft portions 27, 27 and pivot shaft portions 28, 28 which are parallel to but are offset from each other. Of these portions, the support shaft portions 27, 27 are rotatably supported inside their respective circular holes 26, 26 through another radial needle roller bearings 29, 29, respectively. Also, on the peripheries of the pivot shaft portions 28, 28, there are rotatably supported power rollers 8, 8 through still another radial needle roller bearings 30, 30, respectively.

By the way, the pair of displacement shafts 7, 7 are disposed at 180° opposite positions with respect to the input shaft 15. Also, the offset directions of the pivot shaft portions 28, 28 of these displacement shafts 7, 7 with respect to their respective support shaft portions 27, 27 are the same directions (in FIG. 5, the reversed right and left directions) with respect to the rotation directions of the input side and output side disks 2, 4. These offset directions are set almost perpendicular to the direction in which the input shaft 15 is disposed. Therefore, the power rollers 8, 8 are supported in such a manner that they can be shifted to a certain degree in the axial direction of the input shaft 15 (that is, in FIG. 4, in the right and left direction; and, in FIG. 5, in the front and back direction). As a result of this, even in case where the power rollers 8, 8 are shifted in the axial direction of the input shaft 15 due to the elastic deformation of the component members of the toroidal-type continuously variable transmission caused by large loads applied to the component members while the rotation force is being transmitted, such shift of the power rollers 8, 8 can be absorbed without applying an unreasonable force to the component members.

Also, between the outer surfaces of the power rollers 8, 8 and the inner surfaces of the middle portions of the trunnions 6, 6, there are disposed thrust ball bearings 31, 31 and thrust needle roller bearings 32, 32 sequentially in order starting from the outer surfaces sides of the power rollers 8, 8. Of these bearings, the thrust ball bearings 31, 31, while supporting thrust-direction loads applied to the power rollers 8, 8, allow the rotation of the power rollers 8, 8. Also, the thrust needle roller bearings 32, 32, while supporting thrust loads applied to outer races 33, 33 respectively forming a part of their associated thrust ball bearings 31, 31 from the power rollers 8, 8, allow the pivot shaft portions 28, 28 as well as the outer races 33, 33 to swung about their associated support shaft portions 27, 27.

Further, to the respective one-end portions (in FIG. 5, the left end portions) of the trunnions 6, 6, there are connected drive rods 34, 34, respectively; and, to the outer peripheral surfaces of the middle portions of the drive rods 34, 34, there are fixedly secured a pair of drive pistons 35, 35, respectively. And, these drive pistons 35, 35 are respectively mounted into their associated drive cylinders 36, 36 in an oil-tight manner.

In the case of the above-structured toroidal-type continuously variable transmission, the rotation of the input shaft 15 is transmitted through the pressure device 9 to the input side disk 2. And, the rotation of the input side disk 2 is then transmitted through the pair of power rollers 8, 8 to the output side disk 4 and further the rotation of the output side disk 4 is taken out by the output gear 19. To change a rotation speed ratio between the input shaft 15 and output gear 19, the pair of drive pistons 35, 35 may be shifted in the mutually opposite directions. That is, as the drive pistons 35, 35 are shifted, the pair of trunnions 6, 6 are respectively shifted in the opposite directions, so that, for example, the power roller 8 disposed on the lower side in FIG. 5 is shifted to the right in FIG. 5, whereas the power roller 8 disposed on the upper side in FIG. 5 is shifted to the left in FIG. 5. This changes the direction of a tangential-direction force which acts on the contact portions between the peripheral surfaces 8a, 8a of the power rollers 8, 8 and the inner surfaces 2a, 4a of the input side and output side disks 2, 4. And, with such direction change of the tangential-direction force, the trunnions 6, 6 are swung in the mutually opposite directions about their respective pivot shafts 5, 5 which are pivotally supported on the support plates 21, 21. This changes the contact positions between the peripheral surfaces 8a, 8a of the power rollers 8, 8 and the inner surfaces 2a, 4a of the input side and output side disks 2, 4, so that the rotation speed ratio between the input shaft 15 and output gear 19 can be changed.

By the way, when carrying out the rotation force transmission between the input shaft 15 and output gear 19, the power rollers 8, 8 are shifted in the axial direction of the input shaft 15 due to the elastic deformation of the component members, and the displacement shafts 7, 7, which pivotally support the power rollers 8, 8, are slightly rotated about their respective support shaft portions 27, 27. As a result of such slight rotation of the displacement shafts 7, 7, the outer surfaces of the outer races 33, 33 of the thrust ball bearings 31, 31 and the inner surfaces of the trunnions 6, 6 are shifted with respect to each other. Because the thrust needle roller bearings 32, 32 are interposed between the outer surfaces of the outer races 33, 33 of the thrust ball bearings 31, 31 and the inner surfaces of the trunnions 6, 6, these outer and inner surfaces can be shifted with a small force. Therefore, the inclination angles of the displacement shafts 7, 7 can be changed in the above-mentioned manner with a small force.

Figure 7:
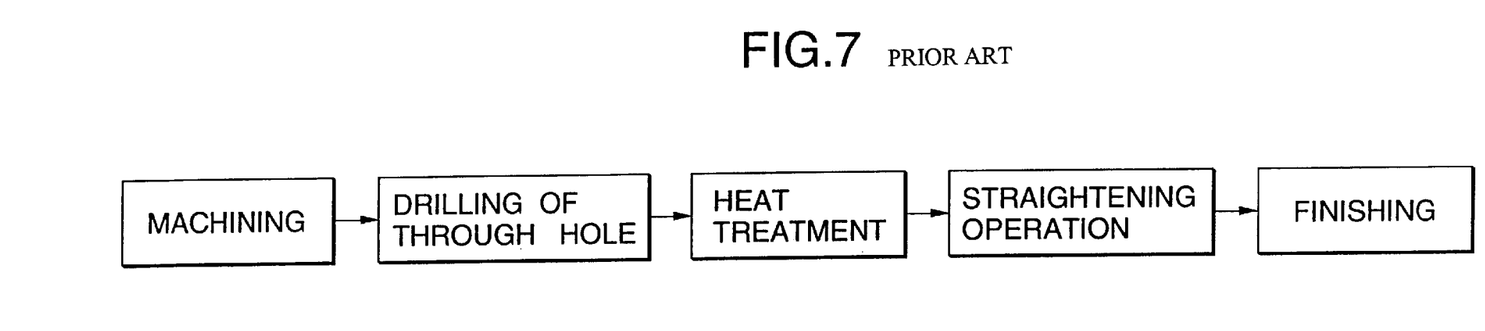
FIG. 7 is a flow chart of a conventional method for working an input shaft; and, FIG. 8 is a schematic view of the enforcing state of a straightening operation to straighten the bent portions of an input shaft.

The input shaft 15 of the toroidal-type continuously variable transmission, which is structured and operates in the above-mentioned manner, is conventionally worked according to such a process as shown in FIG. 7. That is, after the outer peripheral surface of a blank member made of metal such as chrome-molybdenum steel is machined, the plurality of through holes 17, 17 are formed in the input shaft 15 using a drill (a drilling machine). Next, after heat treatment for hardening the outer peripheral surface of the input shaft 15 is given on the input shaft 15, there is executed a straightening operation which straightens or remedies bent portions caused in the input shaft 15 by the heat treatment. After then, a finishing operation such as a grinding operation for obtaining the desired dimensions and surface roughness of the input shaft 15 is performed on the input shaft 15, thereby finishing the input shaft 15 as a final product.

Figure 8:
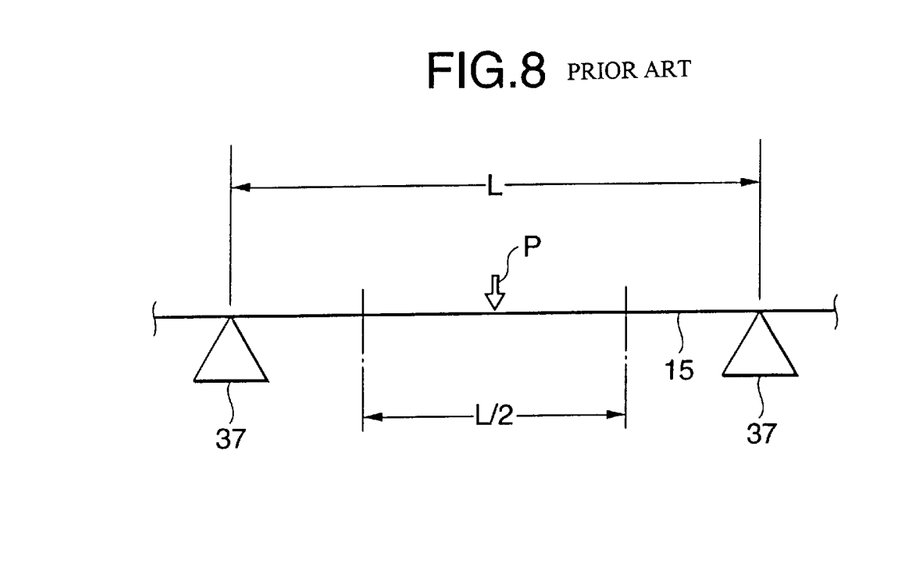

However, in the above-mentioned conventional working method for working the input shaft, in case where, after formation of the through holes 17, 17 in the input shaft 15, the straightening operation for straightening the bent portions of the input shaft 15 is executed, there is a possibility that damage such as a crack can occur in the input shaft 15 at and from the through holes 17, 17 portions thereof. That is, the above straightening operation is carried out in such a manner as generally shown in FIG. 8 that the two positions of part of the input shaft 15 spaced from each other in the axial direction of the input shaft 15 are supported by their respective support blocks 37, 37 while facing the projecting portion of the bent portion upwardly; and, in this state, a force P in the downward direction is applied to the middle portion between the two support blocks 37, 37.

In this straightening operation, tensile stresses or compression stresses are applied to the respective portions of the input shaft 15; and, such stresses become large (that is, concentration of the stresses occur) in the through holes 17, 17 portions of the input shaft 15. In other words, in case where the through holes 17, 17 are present in an L portion between the two support blocks 37, 37 shown in FIG. 8, stress concentration occurs in the through holes 17, 17 portions of the input shaft 15. Especially, in case where the through holes 17, 17 are present in the range of L/2 having a center at a point where the force P has been applied, the stress concentration in the through holes 17, 17 portions of the input shaft 15 becomes outstandingly large. This stress concentration makes it easy for the above-mentioned damage to occur in the through holes 17, 17 portions of the input shaft 15. The input shaft 15, in which such damage has occurred, must be wasted as a defective product, which worsens the yield rate of the input shaft and thus gives rise to an increase in the cost of the input shaft. In view of this, in the conventional working method, in order to minimize the occurrence of such damage, the force P is applied while adjusting the force P suitably.

However, even if the force P is applied in this manner, there cannot be prevented such damage, and also automatic execution of the straightening operation is difficult, so that the cost of the input shaft and thus cost of toroidal-type continuously variable transmission cannot be reduced to a sufficient degree.

SUMMARY OF THE INVENTION

The present invention aims at eliminating the above-mentioned drawbacks found in the conventional working method. Accordingly, it is an object of the invention to provide a method for working an input shaft for use in a toroidal-type continuously variable transmission which can manufacture an input shaft without causing damage such as a crack in the through holes portions of the input shaft, thereby being able to enhance the yield rate of the input shaft as well as to allow automatic execution of the working operation of the input shaft, so that the cost of the input shaft can be reduced sufficiently.

In attaining the above object, according to the invention, there is provided a method for working an input shaft for use in a toroidal-type continuously variable transmission, the toroidal-type continuously variable transmission including; the input shaft rotatably supported within a housing, and including a cylindrical through hole formed in the middle portion of the input shaft in the axial direction thereof for allowing the inner and outer peripheral surfaces of the input shaft to communicate with each other; an input side disk and an output side disk respectively concentrically disposed on the periphery of the input shaft, the two disks being supported to be rotatable independently of each other, each of the two disks including an inner peripheral surface having a cross section formed in an arc-shaped concave surface; a plurality of trunnions each swingable around a pair of mutually concentric pivot shafts disposed at torsional positions which are perpendicular to the direction of the center axes of the two disks and do not intersect the center axes; a plurality of displacement shafts respectively supported on the trunnions; and a plurality of power rollers respectively rotatably supported on the peripheries of the displacement shafts, the power rollers being held between the inner surfaces of the input side and output side disks, each of the power rollers including a periphery formed in a spherically-shaped convex surface to abut against each of the inner peripheral surfaces of the two disks, the working method comprising the steps of: machining the outer peripheral surface of the input shaft; performing heat treatment on the input shaft for hardening the machined outer peripheral surface of the input shaft; performing a straightening operation for straightening a bent portion of the input shaft caused by the heat treatment; and forming the though hole in the straightened input shaft. Preferably, the through hole is formed by electric sparks.

Especially, in the working method for working an input shaft for use in a toroidal-type continuously variable transmission according to the invention, after the outer peripheral surface of the input shaft is machined, heat treatment for hardening the machined outer peripheral surface of the input shaft is performed non the input shaft prior to formation of the above-mentioned through hole, after completion of the heat treatment, a straightening operation for straightening the bent portions of the input shaft caused by the heat treatment is executed, and thereafter the input shaft is machined using electric sparks to thereby form the through hole in the input shaft.

With the above-structured working method for working an input shaft for use in a toroidal-type continuously variable transmission according to the invention, since the straightening operation for straightening the bent portions of

DETAILED DESCRIPTION OF THE PREFERRED EMBODIMENTS

Figure 1:
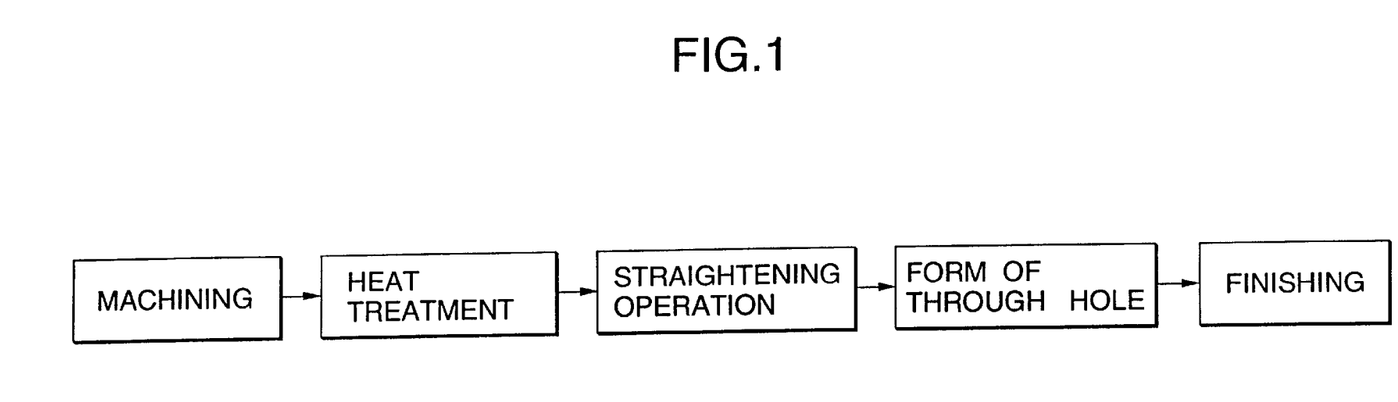
FIG. 1 is a flow chart of a method for working an input shaft according to the invention.

Now, FIG. 1 shows steps employed in a method for working an input shaft for a toroidal-type continuously variable transmission according to the invention. In the present working method, as previously shown in FIG. 6, an input shaft with a plurality of cylindrical through holes 17, 17 allowing the inner and outer peripheral surfaces of the input shaft 15 to communicate with each other is manufactured. At first, a blank member, which has been produced rather larger than a desired shape by forging, is machined by cutting or by turning.

Next, after the above machining operation, heat treatment for hardening the outer peripheral surface of the input shaft 15 is enforced before the through holes 17, 17 are formed and, after then, there is carried out a straightening operation for straightening the bent portions of the input shaft 15 caused by the heat treatment. After then, the through holes 17, 17 are formed using electric sparks. Next, finishing machining such as grinding is performed on the input shaft 15 to thereby obtain the desired dimensions and surface roughness of the input shaft 15.

With the above-structured working method for working an input shaft for a toroidal-type continuously variable transmission according to the invention, since the straightening operation to straighten the bent portions of the input shaft 15 is carried out before the through holes 17, 17 are formed, there is eliminated the possibility that stresses can be concentrated by the straightening operation, which in turn can prevent damage such as a crack from occurring in the input shaft 15 due to such concentration of stresses.

Also, because the forming operation of the through holes 17, 17 is executed by electric spark machining, differently from a drilling operation using a drill, the through holes 17, 17 can be formed easily even in the input shaft 15 which has been hardened by the heat treatment. Also, even a small-diameter hole having an inside diameter of the order of 0.3–2.0 mm can be formed easily.

Since the invention is structured and operates in the above-mentioned manner, not only the yield rate of the input shaft can be enhanced but also the automated manufacturing operation is possible, which makes it possible to realize a low-cost toroidal-type continuously variable transmission.

While only certain embodiments of the invention have been specifically described herein, it will apparent that numerous modifications may be made thereto without departing from the spirit and scope of the invention.

What is claimed is:

1. A method for making an input shaft for use in a toroidal-type continuously variable transmission, said toroidal-type continuously variable transmission including:

said input shaft rotatably supported within a housing, and including a cylindrical through hole formed in the middle portion of said input shaft in the axial direction thereof for allowing inner and outer peripheral surfaces of said input shaft to communicate with each other;

an input side disk and an output side disk respectively concentrically disposed on the periphery of said input shaft, said two disks being supported to be rotatable independently of each other, each of said two disks including an inner peripheral surface having a cross section formed in an arc-shaped concave surface;

a plurality of trunnions each swingable around a pair of mutually concentric pivot shafts disposed at torsional positions which are perpendicular to the direction of center axes of said two disks and do not intersect said center axes;

a plurality of power rollers respectively rotatably supported on the peripheries of said displacement shafts, said power rollers being held between the inner surfaces of said input side and output side disks, each of said power rollers including a periphery formed in a spherically-shaped convex surface to abut against each of the inner peripheral surfaces of said two disks, said working method comprising the steps of:

machining the outer peripheral surface of said input shaft;

performing heat treatment on said input shaft for hardening said machined outer peripheral surface of said input shaft;

performing a straightening operation for straightening a bent portion of said input shaft caused by said heat treatment; and forming said through hole in said straightened input shaft.

2. The method according to claim 1, wherein said through hole is formed by electric sparks.

* * * * *